(12) United States Patent
Stenzel

(10) Patent No.: US 8,263,208 B2
(45) Date of Patent: Sep. 11, 2012

(54) EMBOSSED PLASTIC FILMS FOR LAMINATED GLASS

(75) Inventor: Holger Stenzel, Hennef (DE)

(73) Assignee: Kuraray Europe GmbH, Frankfurt (DE)

( * ) Notice: Subject to any disclaimer, the term of this patent is extended or adjusted under 35 U.S.C. 154(b) by 668 days.

(21) Appl. No.: 12/307,601

(22) PCT Filed: Jul. 9, 2007

(86) PCT No.: PCT/EP2007/056972
§ 371 (c)(1),
(2), (4) Date: Aug. 25, 2009

(87) PCT Pub. No.: WO2008/003789
PCT Pub. Date: Jan. 10, 2008

(65) Prior Publication Data
US 2009/0324889 A1    Dec. 31, 2009

(30) Foreign Application Priority Data
Jul. 7, 2006 (EP) .................................. 06116856

(51) Int. Cl.
*B32B 3/00* (2006.01)
*B32B 3/30* (2006.01)
*B32B 17/10* (2006.01)

(52) U.S. Cl. ........ 428/156; 428/172; 428/179; 428/212; 428/415; 428/425.6; 428/430; 428/437; 428/442

(58) Field of Classification Search .................. 428/141, 428/156, 172, 212, 415, 425.6, 437, 179, 428/430, 442
See application file for complete search history.

(56) References Cited

U.S. PATENT DOCUMENTS

| | | | |
|---|---|---|---|
| 3,137,746 A * | 6/1964 | Seymour et al. | 264/73 |
| 3,956,450 A * | 5/1976 | Abe et al. | 264/210.2 |
| 4,452,840 A | 6/1984 | Sato et al. | |
| 5,455,103 A * | 10/1995 | Hoagland et al. | 428/167 |
| 5,626,809 A * | 5/1997 | Mortelmans | 264/167 |

FOREIGN PATENT DOCUMENTS
EP      1233007 A1    8/2002
WO      9519885 A1    7/1995

* cited by examiner

*Primary Examiner* — Donald J Loney
(74) *Attorney, Agent, or Firm* — Millen, White, Zelano & Branigan, P.C.

(57) ABSTRACT

The invention relates to a plastic film, at least one side of which is provided with a surface structure comprising parallel rows of elevations (a). Said elevations (a) are interconnected by means of webs (b) that are at least 10 percent lower than the elevations (a). The inventive films can be used for producing laminated glass.

19 Claims, 7 Drawing Sheets

EMBOSSED PLASTIC FILMS FOR LAMINATED GLASS

The present invention relates to a plastic film suitable for the production of laminated glass, said plastic film having at least one side with a surface structure of elevations interconnected by webs, and the use of this plastic film.

TECHNICAL FIELD

The plastic films (interlayer films) employed in the production of laminated glass typically have a selectively applied roughness since that way, air trapped between the glass panels and the interlayer film can be removed in the lamination process.

To adjust the roughness of the interlayer films, melt fracture extrusion methods or embossing methods are usually employed. The extrusion of plastic films under melt fracture conditions is disclosed for example in EP 0 185 863 B1 and provides films having an irregular surface.

In the large-scale production of laminated glass panels, such as for example with motor vehicle windshields, films having an oriented, regular surface structure are preferably used. Such surface structures are produced by embossing methods.

PRIOR ART

In the numerous embossing methods known in prior art, the plastic film is provided on one side or both sides with a regular or irregular embossing pattern between two rolls. EP 1 233 007 A1 for example discloses the production of an interlayer film having a regular surface structure formed by channels. The channels are separated from each other by ribs, said ribs optionally having openings across channels. Furthermore, barriers may be present in the channels, which prevent that deaeration of the laminate occurs too fast. On the other hand, the trapped air should not escape too fast and hence uncontrolled since otherwise premature partial sealing of the laminate may occur.

A similar channel structure is described in WO 95/19885. Here, both sides of the interlayer film have a channel structure, which are, however, disposed at an angle of >25° with respect to one another in order to avoid moire patterns. Here, discontinuous channels are provided for deaeration, which only provide deaeration opportunities at two opposite edges over the length of the film. Hereby, edge sealings in particular may be formed.

U.S. Pat. No. 6,093,471 also described interlayer films having a surface structure of V-shaped, continuous ribs, which form a channel-like system. To suppress self-adhesion of the interlayer films, the V-shaped ribs have a certain curvature radius.

U.S. Pat. No. 6,077,374 discloses an interlayer film having one side with an irregular surface produced by melt fracture extrusion and on the other side a regular surface structure made by embossing.

U.S. Pat. No. 4,452,840 discloses films having island-shaped elevations, which allow a fast deaeration to all sides of the film. In case of a melting of the elevations that is too fast, with such surface structures, there is the risk of partial sealing of the laminate.

Besides good deaeration properties, the interlayer films should not produce optical defects during the production of laminated glass, i.e. the surface structures must melt off completely in the lamination process. Nevertheless, the surface structures must permit escaping of the trapped air that is as complete as possible, i.e. they should not melt off too fast but must have sufficient mechanical and thermal stability.

The surface structures described in prior art are still capable of improvement in this respect.

OBJECT

It was therefore the object of the present invention to provide a plastic film having a surface structure, which shows gut deaeration behavior during the production of laminated glass.

PRESENTATION OF THE INVENTION

Subject matter of the present invention is therefore a plastic film having on at least one side a surface structure of parallel rows of elevations (a) interconnected by webs (b) that are at least 10 percent lower than the elevations (a), said parallel rows being staggered in such a way that the elevations of one row adjoin the webs of an adjacent row and form a common valley bottom (c). In the simplest case, the elevations and webs of two adjacent rows are alternatingly applied on the film.

Films according to the invention have an especially good deaeration behavior during production of laminated glass since air can not only escape via valley bottoms between elevations but also perpendicular thereto via webs between elevations. This is an advantage in case of a premature edge sealing of the laminate since trapped air can still escape via other, open edge positions.

It is important that air trapped in the laminate can escape to numerous sides in a steady manner. By means of the surface structures according to the invention, sufficiently fast deaeration is possible and, simoultaneously, a melting of the eleveations that is too fast, such as with the island-shaped elevations on films according to U.S. Pat. No. 4,452,840 or EP 1 233 007, is avoided.

The webs on the film according to the invention provide the surface structure with a certain mechanical and thermal stability since under production conditions of laminated glass, initially the higher elevations melt off and the glass panels rest on the lower webs. Since air can still escape between the webs, an excellent deaeration behavior of the film in the lamination process results.

The surface structures of the films according to the invention are applied to the plastic film by embossing. For this, it is necessary to apply the structure to be embossed as female die to an embossing roll and to press the plastic film with sufficient force onto this embossing roll. Methods suitable for this purpose are known to those skilled in the art and may be obtained for example from EP 0 741 640 B1, U.S. Pat. Nos. 5,972,280, 4,671,913, US 2003/0022015, WO 01/72509,0 U.S. Pat. Nos. 6,077,374, or 6,093,471.

BRIEF DESCRIPTION OF THE DRAWINGS

The structure used according to the invention is schematically outlined in FIGS. 1 and 2. In the top and side views, the elevations are marked with (a) and the webs positioned between the elevations are marked with (b). Elevations and webs of adjacent rows have a common valley bottom (c) that is almost continuous. The structures depicted in FIGS. 1 and 2 are meant to merely depict examples for structures useable according to the invention; the present invention is not limited to these geometries. FIG. 3 shows a surface picture of an embossing roll with a structure according to FIG. 1.

Figure 1:
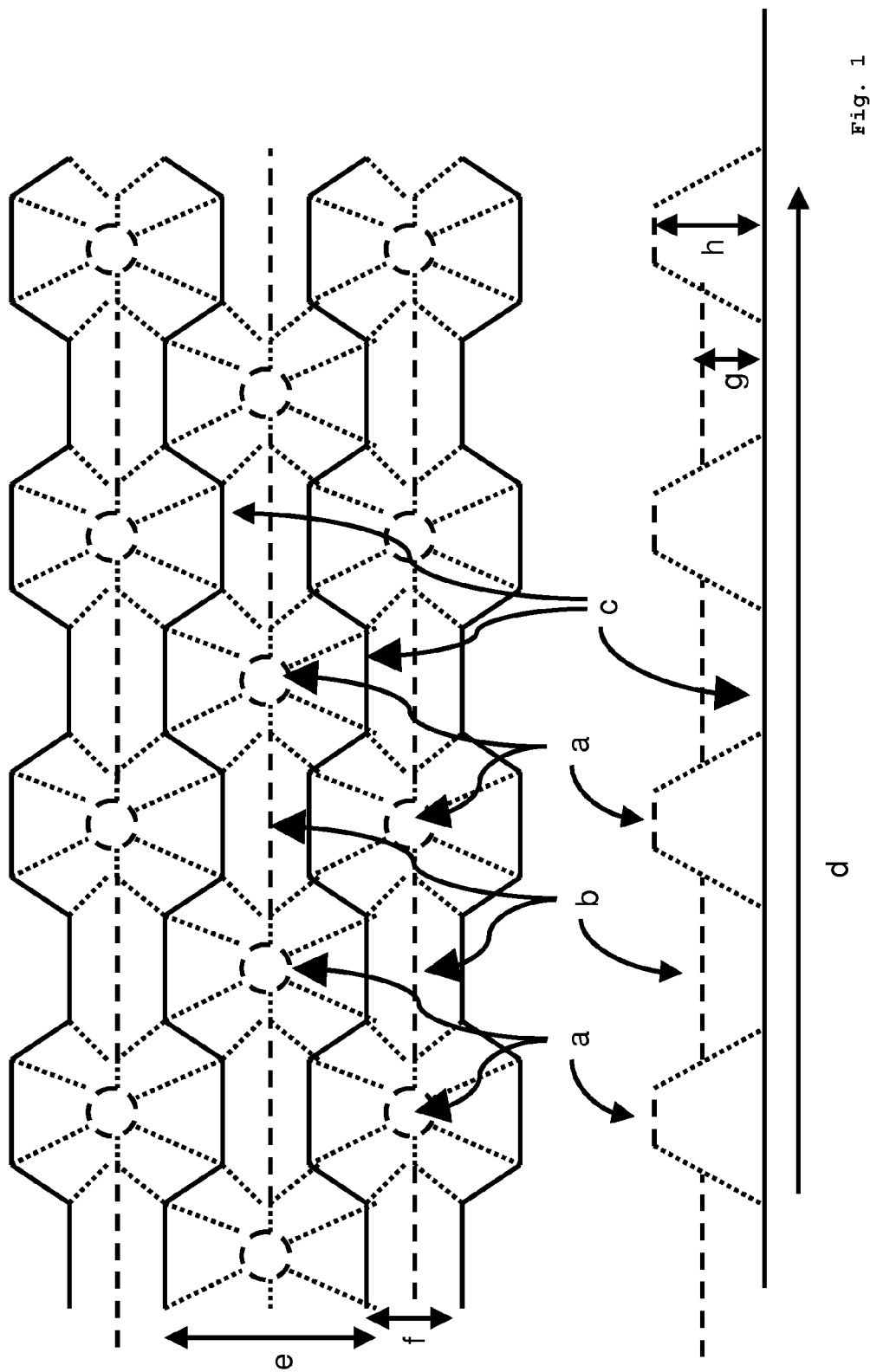
FIG. 1 illustrates a top and side view of an embodiment according to the invention.
Figure 2:
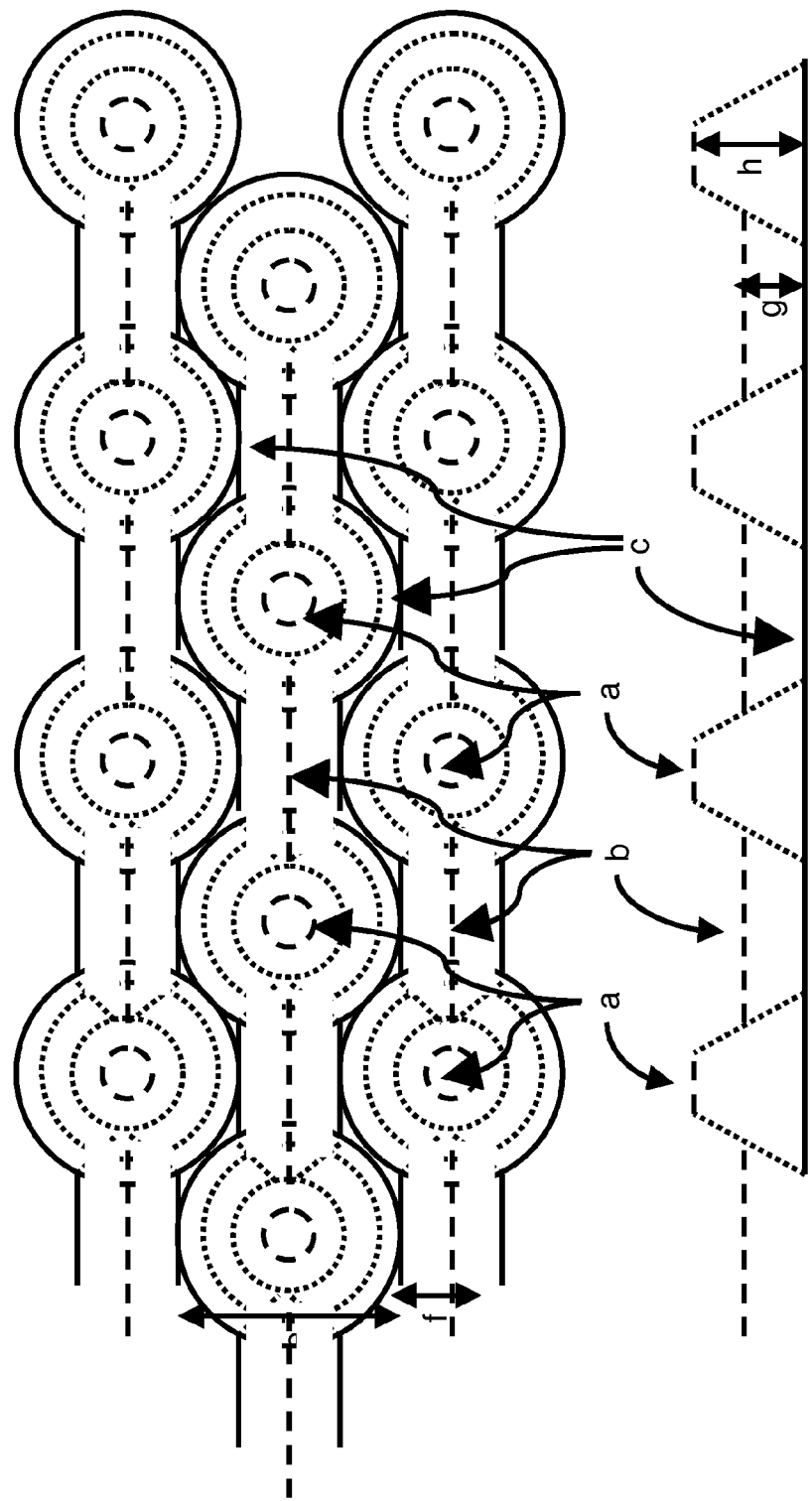
FIG. 2 illustrates a top and side view of another embodiment according to the invention.
Figure 3:
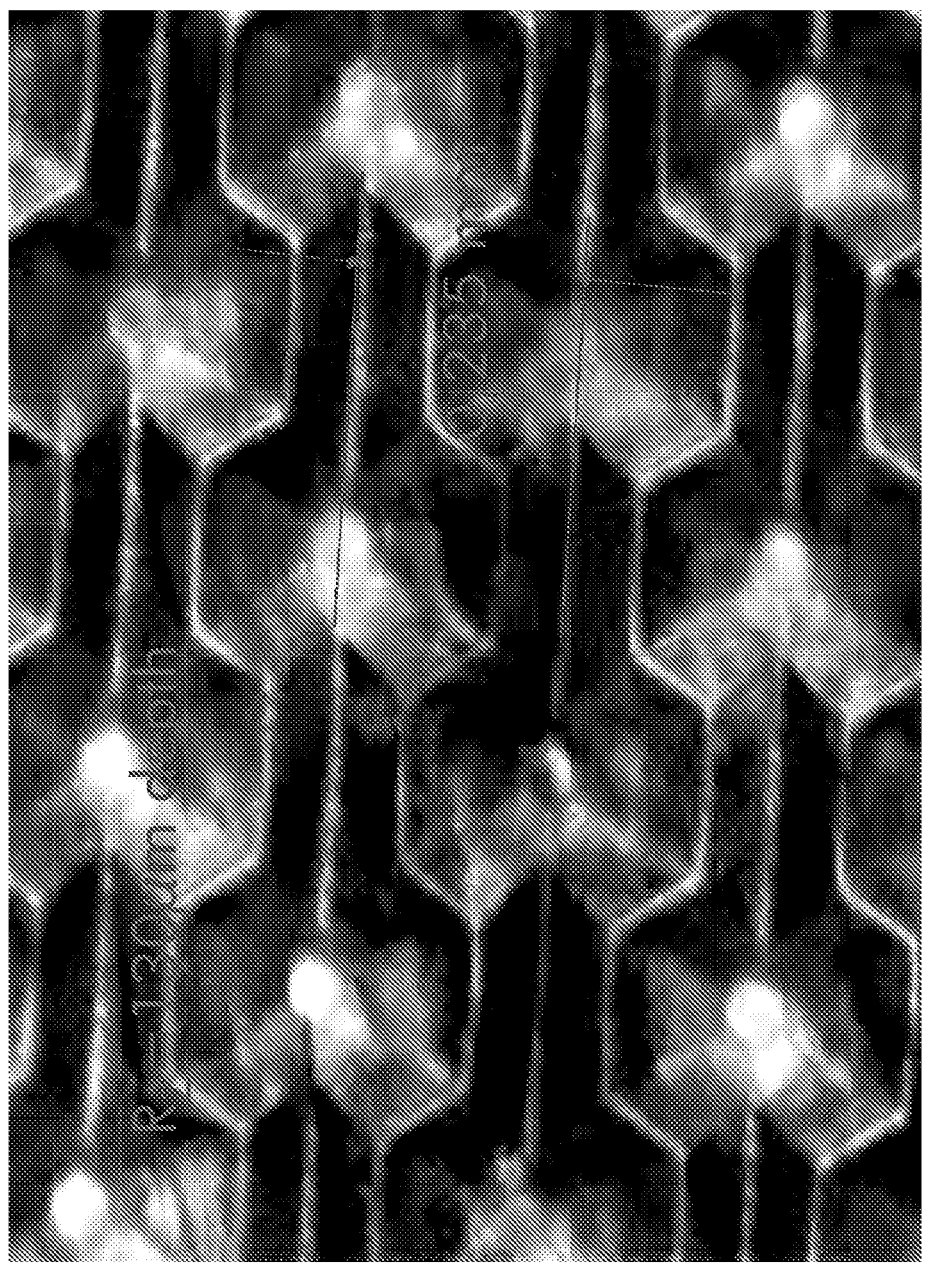
FIG. 3 is a surface picture of an embossing roll for use in forming the web structure shown in FIG. 1.

In the ideal case, the surface structure of the films according to the invention has a quality according to FIG. 1 or 2. Depending on the process parameters in the embossing process (speed, film temperature, temperature of the embossing rolls, embossing pressure), the quality of the surface structure of the films according to the invention may differ from that. The measurements specified within the scope of the present invention are therefore to be interpreted as average values. The average values are to be determined using at least 10 measured values of identical objects (for example the height of 10 elevations) and subsequently have to be averaged arithmetically. The height specifications are with respect to the valley bottom positioned between elevations, as "zero height", an average height of the valley bottom over a distance of 0.5 cm being determined. The height of the elevations or webs is determined by averaging the 2 highest and lowest points each of an elevation or web. The procedure for width specifications is analogous, the width to be determined being determined at at least 5 measuring points.

The elevations and webs of the surface structures of films according to the invention are arranged in parallel rows. For the purpose of the present invention, the running direction of these rows is the direction in which the rows continue, such as for example direction (d) marked in FIG. 1. In contrast, the designation "against the running direction" refers to a direction perpendicular to the running direction, such as for example (e) or (f) in FIG. 1.

The elevations preferably have a width determined in and/or against the running direction of the rows of 110 to 400%, more preferably 150 to 300%, most preferably 180 to 220%, of the width of the webs determined in the same running direction. If the width of the elevations and webs is determined against the running direction, the widths identified with (e) and (f) in FIG. 1 result.

The maximum width of the elevations (a) between two valley bottoms determined in and/or against the running direction of the rows is 100 to 750 µm, preferably 100 to 300 µm, in particular 150 to 250 µm or 300 to 750 µm, preferably 500 to 750 µm.

Analogously, the maximum width of the webs (b) in and/or against the running direction of the rows, between two valley bottoms is preferably 50 to 250 µm, in particular 100 to 200 µm.

The webs have a height that is at least 10% lower than the height of the elevations. A height of the webs that is too low does not improve the deaeration properties. The height of the webs should therefore be at least 51%, preferably 67%, and most preferably 75% of the height of the elevations. This means that the height of the webs can be lower than the height of the elevations by 10 to 49%, in particular by 10 to 33%, and especially preferably by 10 to 25%.

The valley bottom (c) formed between two rows is preferably almost continuous, i.e. it has a smooth progression without barriers or the like possible within the limits of embossing techniques. The width of the valley bottom determined in the running direction of the rows, i.e. the lowest point between two rows, should be as small as possible and has a maximum width of 0 to 50 µm, in particular 1 to 40 µm.

The elevations (a) are preferably designed with a height of 60 to 250 µm, in particular 100 to 200 µm (h in FIG. 1). The height of the webs (b) may be 30 to 225 µm, in particular 50 to 100 µm ((g) in FIG. 1).

The elevations may have a pyramidal or cone-shaped geometry that may be designed both symmetrically and asymmetrically.

The base of the elevations (a) may be designed in round, quadrangular, hexagonal, or octagonal fashion; each symmetrical or asymmetrical. The webs (b) interconnecting the elevations preferably have a semicircular or roof-shaped geometry.

Plastic films according to the invention may be provided on one side or both sides with the surface structures mentioned.

If both surfaces of the plastic film have the surface structures mentioned, said structures have an angle, which is determinable in the running direction of the rows (for example by means of an imaginary connecting line across the elevations), with respect to one another. In one alternative of the present invention, an angle of 0 to 45°, in particular 1 to 45°, and in another alternative an angle of 45 to 90° is preferred. With an angle different from 0°, the formation of so-called moire patterns in the laminated glass can be avoided.

In practice, the plastic films according to the invention have a long-stretched rectangular geometry in the form of a ribbon. This is particularly true for films produced by extrusion. During processing of the plastic films according to the invention, it may be convenient that the parallel rows of the surface structures have an angle with respect to the running direction of the film that is different from 0°. To improve the deaeration properties of the laminate, this angle is preferably 10 to 80°.

Plastic films according to the invention are preferably obtained by extrusion of a polymeric material. They preferably comprise a material from the group of plasticizer-containing polyvinyl acetal, plasticizer-containing polyvinyl butyral, ethylene/vinyl acetate copolymers, ethylene/vinyl acetate/vinyl alcohol copolymers, partially acetalized ethylene/vinyl acetate/vinyl alcohol copolymer, polyethylene terephthalate, polyvinyl chloride, and/or polyurethane. Materials of this type are known to those skilled in the art and do not have to be described in more detail.

The embossing process itself is performed in known manner. Suitable processes are described in the European Applications No. 06112159 or 06112163. In practice, it has proven of value to emboss the surface structure mentioned onto films having a roughness that is as low as possible of Rz=1-30. Films of this kind may be obtained by extrusion of a film under melt fracture conditions, for example in accordance with EP 0185863.

Films according to the invention have excellent deaeration properties in the production of laminated glass. Therefore, the films mentioned are preferably used for the production of laminated glass made of one or more plastic films and at least two glass or plastic panels. The production of such laminates is known to those skilled in the art and may be looked up for example in WO 03/033583.

EXAMPLES

A plasticizer-containing PVB film made of 72.5% by weight of PVB, 25.0% by weight of 3G8 with potassium and magnesium salts as antiblocking agents and with a roughness Rz≦5 μm on both sides was embossed between a pressure roll made of rubber and an embossing roll having an inverse surface structure to FIG. 2. The film embossed on one side obtained in this manner was subsequently processed into a double-sidedly embossed film in a second embossing stage with identical properties on the second side.

| Pressure roll made of rubber: | |
| --- | --- |
| Hardness of rubber roll | 70 ± 5 Shore-A |
| Rubber roll diameter: | 255 mm |
| Embossing roll (structure inverse of FIG. 2): | |
| Embossing roll diameter: | 245 mm |
| Height of elevations | approx. 135 μm |
| Width of elevations | approx. 310 μm |
| Spacing of elevations in running direction | approx. 410 μm |
| Height of webs | approx. 65 μm |
| Width of webs | approx. 130 μm |

Figure 4:
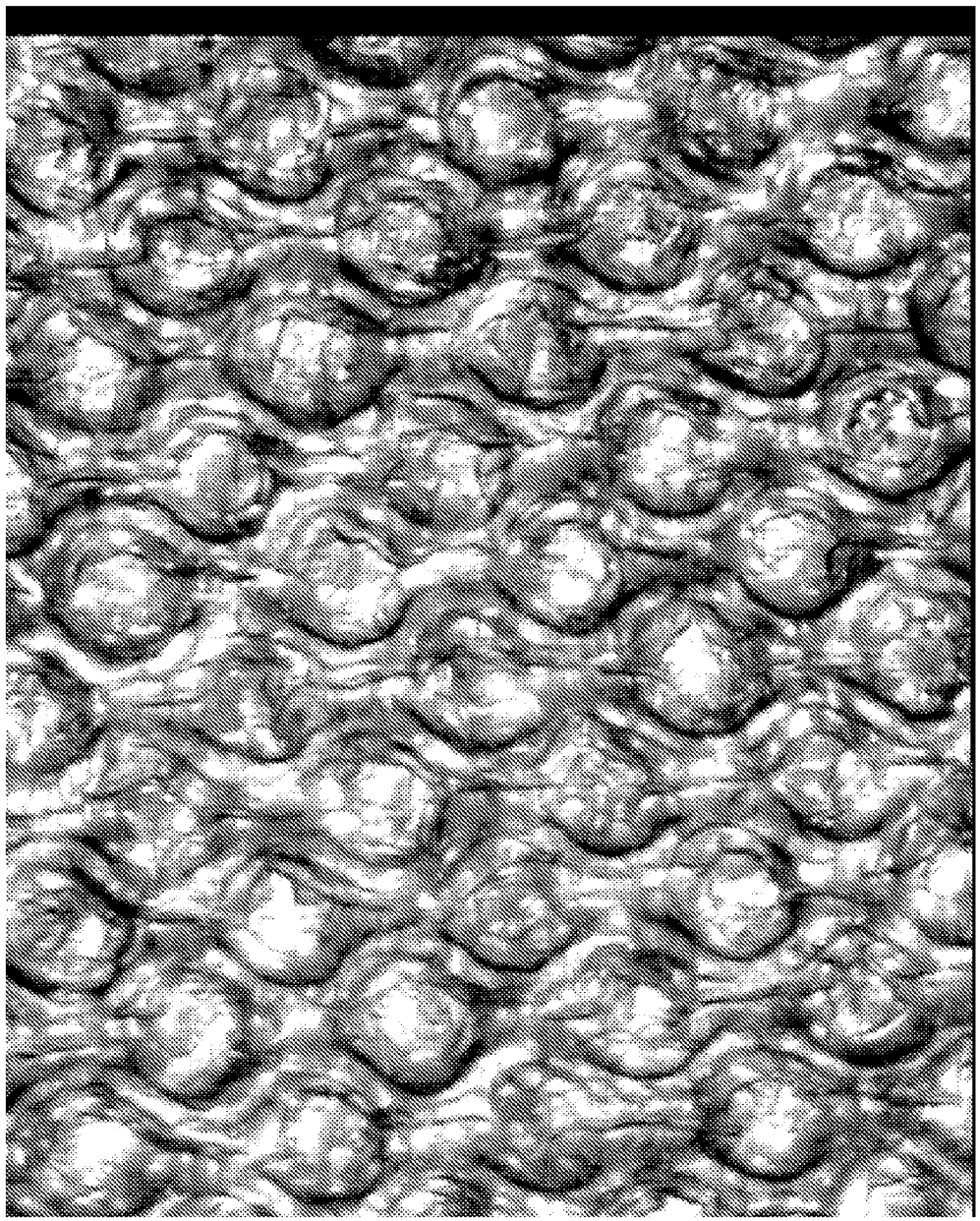
FIG. 4 is a surface picture of a film obtained using an embossing roll having an inverse surface structure to that shown in FIG. 2.

FIG. 4 shows a surface picture of a film obtained in this manner.

The film was subsequently placed between two glass panels and processed over a period of 20 min at room temperature and subsequently 25 min each at 75° C. or 95° C. in a vacuum cabinet at 200 mbar absolute into an almost transparent pre-laminate.

For comparison, films having an irregular surface structure produced by melt fracture (for example in accordance with EP 0 185 863) were subjected to the same pre-laminate process.

Figure 5:
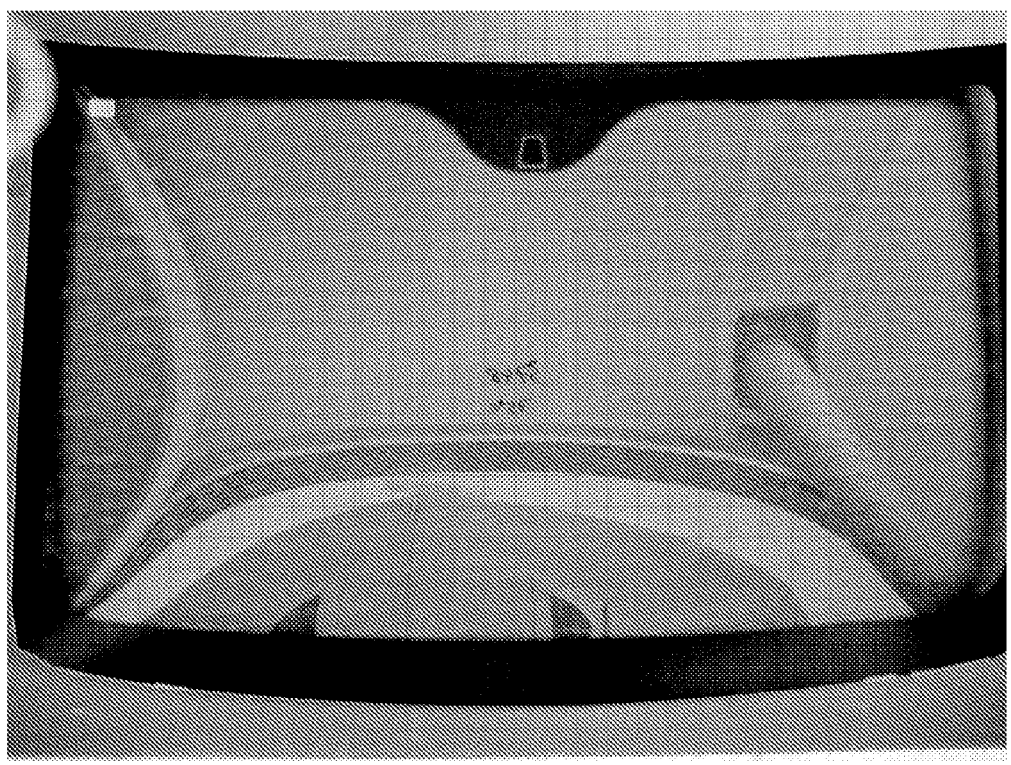
FIG. 5 shows a pre-laminate produced with a film according to the invention, produced at a pre-laminate temperature of 75° C. or 95° C.
Figure 6:
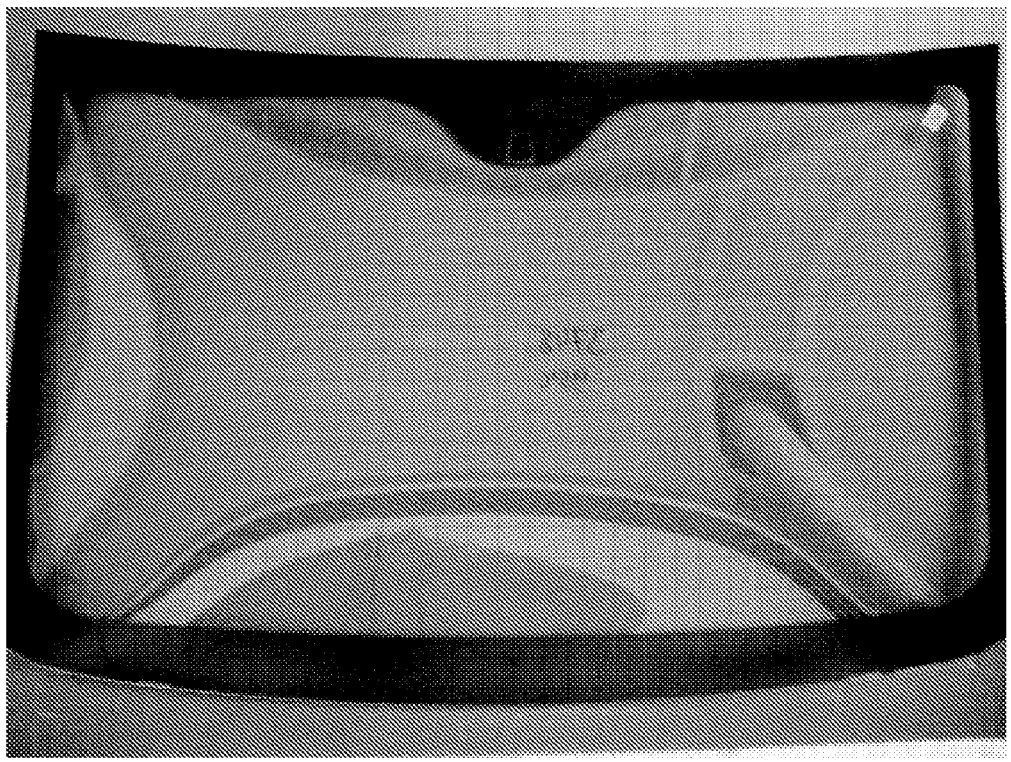
FIG. 6 shows another pre-laminate produced with a film according to the invention, produced at a pre-laminate temperature of 75° C. or 95° C.

FIGS. 5 and 6 show pre-laminates produced with films according to the invention, produced at a pre-laminate temperature of 75° C. or 95° C. The pre-laminates were almost transparent and did not have any blisters or haze.

Figure 7:
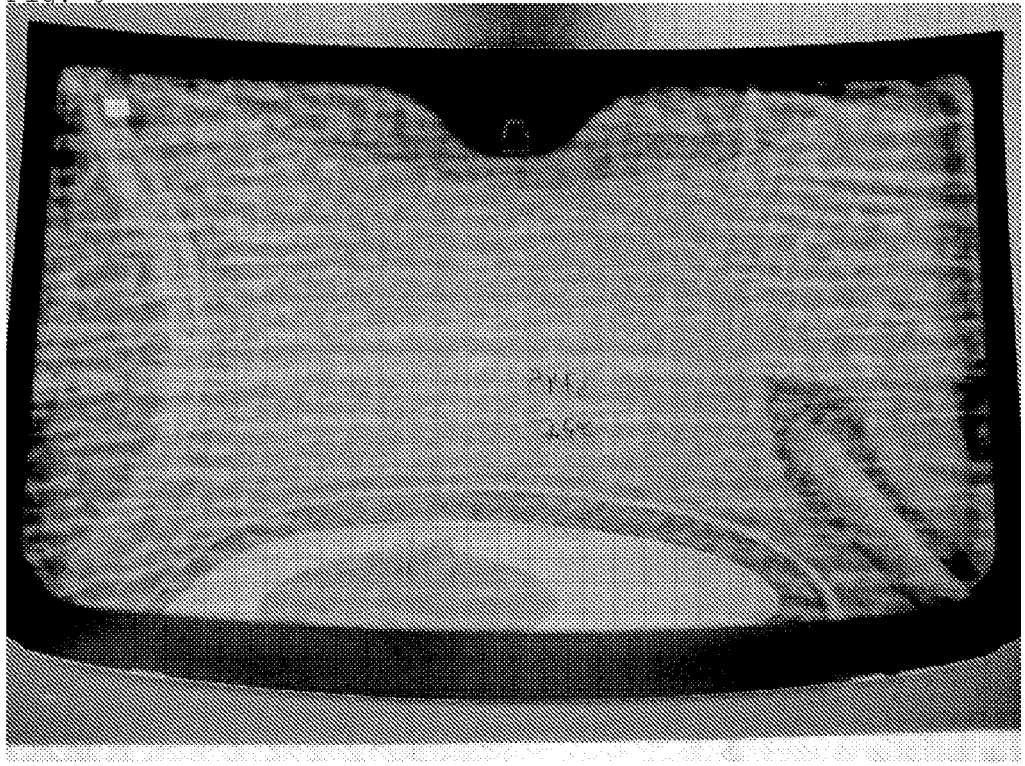
FIG. 7 shows a pre-laminate produced from a film with a melt fracture surface (production temperature of 75° C. or 95° C.)
Figure 8:
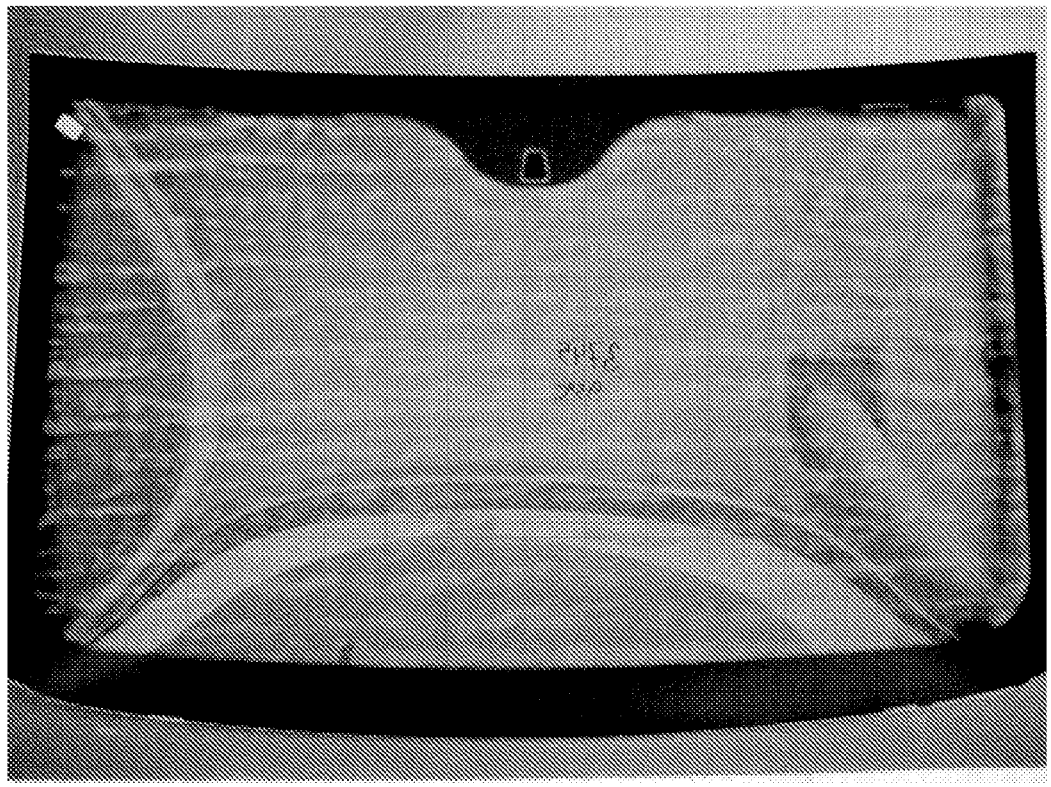
FIG. 8 shows another pre-laminate produced from a film with a melt fracture surface (production temperature of 75° C. or 95° C.).

In contrast, FIGS. 7 and 8 show pre-laminates produced from films with a melt fracture surface (production temperature of 75° C. or 95° C.). The pre-laminates contained air blisters and were appropriately turbid.

The trapped air can lead to defects (for example blisters) in the final laminated glass. In contrast, there is no longer air in the pre-laminates produced with films according to the invention, whereby the risk of blister formation can be practically eliminated.

Compared to a film having an irregular melt fracture surface, the embossed film had significantly better deaeration properties during laminated glass production.

The invention claimed is:

1. A plastic film comprising: on at least one side a surface structure of parallel rows of elevations (a) interconnected by webs (b)
   wherein the parallel rows are staggered in such a way that the bases of the elevations of one row adjoin the webs of an adjacent row and form a common valley bottom (c), wherein webs (b) at their highest level have a height, with respect to valley bottom (c) positioned between elevations, which is at least 10 percent lower than height of the elevations (a), with respect to valley bottom (c) positioned between elevations, and the common bottom valley (c) is lower than the highest level of the webs, and wherein the plastic film comprises a material selected from plasticizer-containing polyvinyl acetal, plasticizer-containing polyvinyl butyral, ethylene/vinyl acetate copolymers, ethylene/vinyl acetate/vinyl alcohol copolymers, partially acetalized ethylene/vinyl acetate/vinyl alcohol copolymer, polyethylene terephthalate, polyvinyl chloride, and/or polyurethane.

2. A plastic film according to claim 1, wherein the width of the elevations (a) determined in and/or against the running direction of the rows is 110 to 400% of the width of the webs determined in the same running direction.

3. A plastic film according to claim 1, wherein the valley bottom (c) formed between two rows is almost continuous and has a maximum width determined against the running direction of the rows of up to 50 μm.

4. A plastic film according to claim 1, wherein the elevations (a) have a height of 60-250 μm.

5. A plastic film according to claim 1, wherein the width of the elevations (a) is at its maximum width between two valley bottoms and this maximum width is 100-750 μm.

6. A plastic film according to claim 1, wherein the webs (b) have a height 30-225 μm.

7. A plastic film according to claim 1, wherein the width of the webs (b) is at its maximum between two valley bottoms, determined in and/or against the running direction the rows, and this maximum width is 50-250 μm.

8. A plastic film according to claim 1, wherein the elevations (a) have a pyramidal or cone-shaped geometry.

9. A plastic film according to claim 1, wherein the elevations (a) have a round, quadrangular, hexagonal, or octagonal base.

10. A plastic film according to claim 1, wherein the webs (b) have a semicircular geometry.

11. A plastic film according to claim 1, wherein the parallel rows have an angle with respect to the running direction of the film of 10 to 80°.

12. A plastic film according to claim 1, wherein both surfaces of the plastic film have the surface structure.

13. A plastic film according to claim 12, wherein the parallel rows of the two surfaces of the plastic film have an angle determined in the running direction of the rows with respect to each other of 0 to 45°.

14. A plastic film according to claim 13, wherein the parallel rows of the two surfaces of the plastic film have an angle determined in the running direction of the rows with respect to each other of 45 to 90°.

15. A laminated product comprising at least two glass or plastic panels laminated together by one or more plastic films, wherein at least one of said films is a film according to claim 1.

16. A plastic film according to claim 1, wherein the webs (b) have a triangular geometry.

17. A plastic film according to claim 3, wherein the valley bottom (c) formed between two rows has a maximum width determined against the running direction of the rows of 1 to 40 μm.

18. A plastic film according to claim 1, wherein the elevations (a), webs(b), and valley bottom (c) are applied to the plastic film by embossing.

19. A plastic film according to claim 1, wherein the height of the webs is lower than the height of the elevations by 10 to 49%.

* * * * *